United States Patent [19]

Stevens

[11] 4,277,728
[45] Jul. 7, 1981

[54] POWER SUPPLY FOR A HIGH INTENSITY DISCHARGE OR FLUORESCENT LAMP

[75] Inventor: Carlile R. Stevens, Danville, Calif.

[73] Assignee: Stevens Luminoptics, San Ramon, Calif.

[21] Appl. No.: 903,583

[22] Filed: May 8, 1978

[51] Int. Cl.³ .................. G05F 1/00; H05B 37/02; H05B 39/04; H05B 41/36
[52] U.S. Cl. .................. 315/307; 315/DIG. 5; 315/DIG. 7; 315/194; 315/247; 315/308; 315/291
[58] Field of Search .............. 315/DIG. 5, 247, 307, 315/308, DIG. 7, 194, 287, 291; 331/113 A

[56] References Cited
U.S. PATENT DOCUMENTS

| 3,265,930 | 8/1966 | Powell, Jr. | 315/307 X |
| 3,969,652 | 7/1976 | Herzog | 315/308 |
| 3,999,100 | 12/1976 | Dendy et al. | 315/308 |
| 4,060,751 | 11/1977 | Anderson | 315/DIG. 5 |
| 4,060,752 | 11/1977 | Walker | 315/DIG. 5 |
| 4,109,307 | 8/1978 | Knoll | 315/247 |

Primary Examiner—Saxfield Chatmon, Jr.
Attorney, Agent, or Firm—Roger A. Marrs

[57] ABSTRACT

This power supply for a high intensity gas discharge or fluorescent lamp exhibits near unity power factor with no third harmonic distortion, and facilitates highly efficient lamp operation with dimming capability. This is achieved by using an inverter to drive a resonant network that includes the lamp load. A feedback circuit adjusts the switching rate of the inverter to equal the resonant frequency of the network. Sinusoidal output voltage is achieved, together with voltage multiplication to a level sufficient to ignite the lamp and keep it lit during dimming. The inverter is driven by a switching regulator that is supplied with unfiltered, rectified ac power. A filter capacitor, connected across the regulator output, is sufficiently large so as to filter at the frequency of the rectified ac input. The regulator switching duty cycle is controlled in response to the average dc level across this filter capacitor. Lamp dimming is achieved either by adjusting the switching regulator dc output level or by varying the duty cycle of the inverter. The high power factor low distortion regulator concept may also be applied in other application where direct current power is derived from an ac line.

33 Claims, 8 Drawing Figures

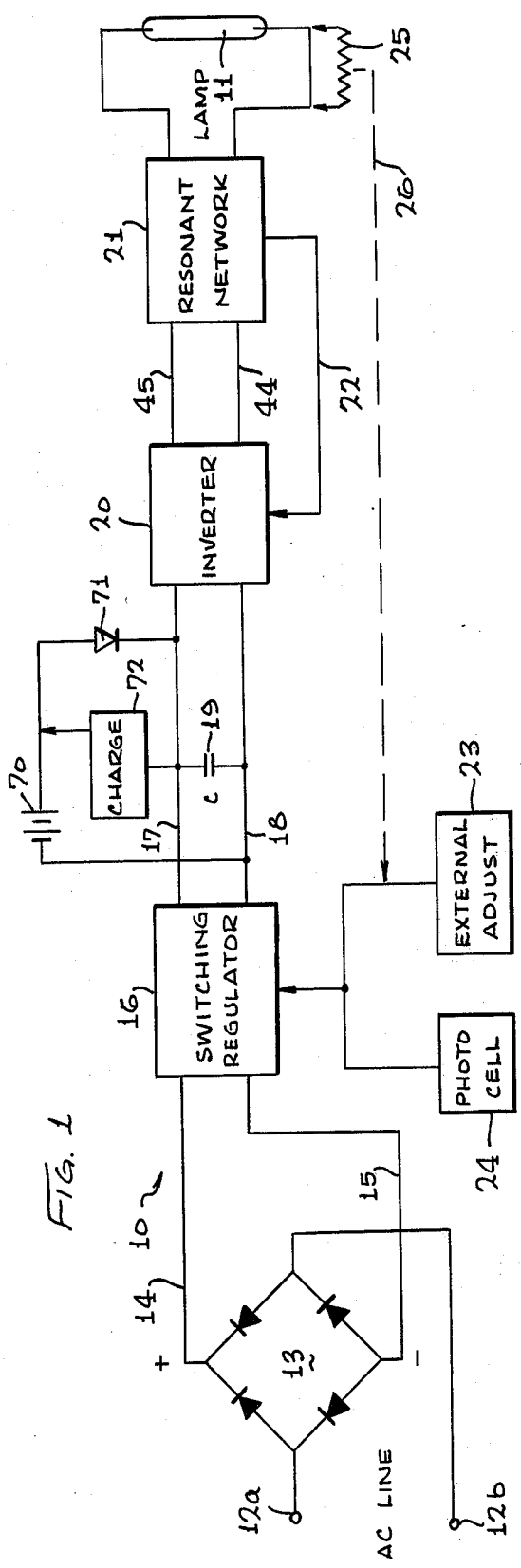
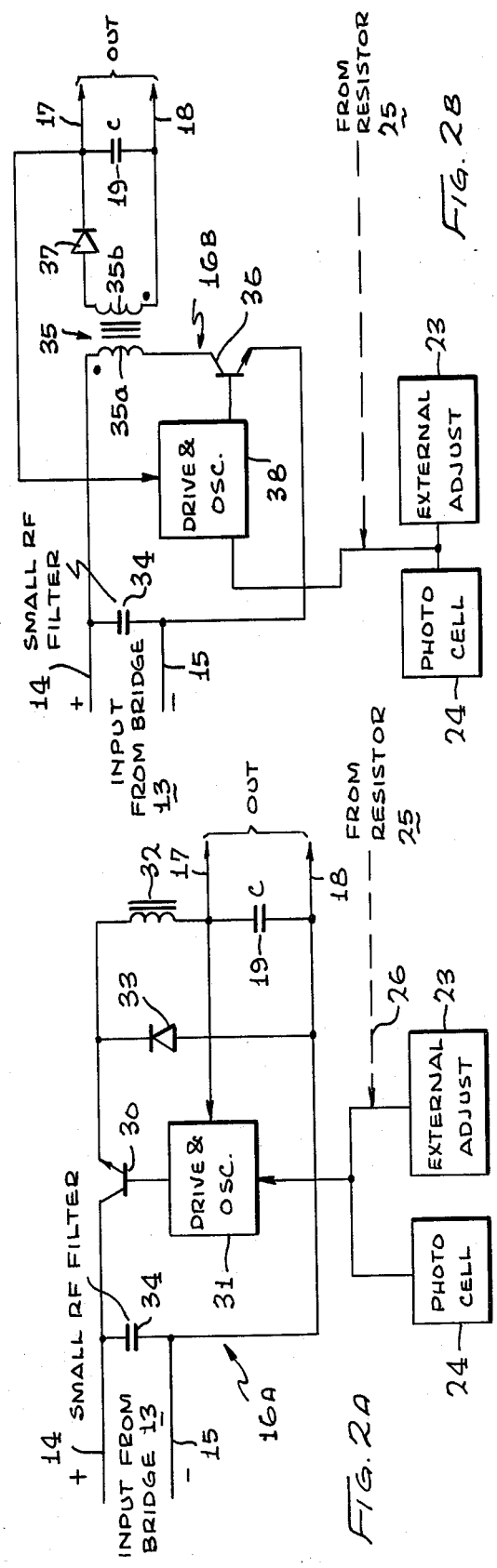

NORMAL REGULATOR ON TO OFF TIME RATIO IN RESPONSE TO LINE VOLTAGE

POWER FACTOR CORRECTED WITH LARGE INDUCTOR AND SMALL CAPACITOR

POWER FACTOR CORRECTED USING SMALL INDUCTOR AND LARGE CAPACITOR

POWER SUPPLY FOR A HIGH INTENSITY DISCHARGE OR FLUORESCENT LAMP

BACKGROUND OF THE INVENTION

1. Field of the Invention

The present invention relates to a power supply for a gas discharge lamp, and particularly to such a device employing a switching regulator reflecting a unity power factor and no third harmonic distortion to the ac line, an inverter and a resonant network including the lamp load, the inverter operating at the resonant frequency of the network to provide a sinusoidal output voltage.

2. Description of the Prior Art

Various types of gas discharge lamps are widely used for lighting purposes. These include fluorescent lamps, high intensity discharge lamps of different types including the metal halide varieties and sodium lamps of both high and low pressure. A common feature of all these lamps is that they require some type of ballast for operation. Ordinarily ballast transformers are used. This approach has several shortcomings. For operation at line frequency, the ballast must be of substantial physical size and weight, resulting from the large magnetic transformers and capacitors that are required. Efficiency is low. The ballast must be operated at the rated line voltage, and any serious deviation can cause either the ballast to overheat or the lamp to flicker. Dimming of the lamp is difficult or impossible.

One approach of the prior art to overcome these difficulties has been the use of switching regulators to provide to the lamp a direct current that is switched on and off at a high frequency. While dc will light the lamp adequately, a specially designed lamp is required if the lamp lifetime is not to be sacrificed considerably. Moreover, such circuits require that the ac line voltage first be rectified and filtered for input to the regulator.

If inductive filtering is used, a very poor power factor will result, and the inductor may have to be the same large size as the original ballast. Also, line distortion is created by the combination of the inductor and the bridge rectifier. If capacitive filtering is used, all of the current will be conducted during the peak of the ac line cycle. This produces "third harmonic distortion" which heats up the pole transformers and requires extra heavy wiring between the device and the power source.

Another approach of the prior art is shown in the U.S. Pat. No. 3,999,100. This supply uses a switching regulator in conjunction with a commutator to provide power to a metal halide lamp. The commutator is operated at or near the ac line frequency.

The principle object of the present invention is to provide an improved electronic ballast for a gas discharge lamp. Other objectives are to provide such a lamp power supply wherein:

(a) no third harmonic distortion is produced and the supply has a near unity power factor;

(b) improved efficiency results from supplying the lamp with high frequency ac power;

(c) dimming is facilitated for both fluorescent and high intensity gas discharge lamps;

(d) the ballast will operate properly despite line voltage variation;

(e) all components are lightweight, small in size and inexpensive;

(f) sufficiently high output voltage is provided to start high intensity gas discharge lamps;

(g) circuitry automatically compensates for changing lamp performance characteristics, including during the warm-up period of high intensity lamps;

(h) sinusoidal output voltage is produced, with concomitant benefits in efficiency, less stringent performance requirements and hence lower cost for the circuit switching transistors, and substantial elimination of radio frequency interference;

(i) dimming may be accomplished in response to ambient light conditions; and (j) provision is made for battery operation in the event of ac power line failure.

Yet another object of the invention is to provide the benefits of (a) (d) (e) for other than ballast applications.

SUMMARY OF THE INVENTION

These and other objectives are achieved in accordance with the present invention by providing a power supply for a gas discharge lamp wherein a switching regulator is used to drive an inverter, the output of which is supplied to the lamp via a resonant network that includes the lamp. A feedback circuit maintains the inverter switching rate at the resonant frequency of the network, so that a sinusoidal output is produced.

The switching regulator is driven by unfiltered rectified ac line power. The regulator utilizes an output filter capacitor which is effective at twice the ac line frequency. The switching duty cycle or rate is responsive to the regulator output voltage averaged over several half cycles of the ac line frequency. In this way, a unity power factor is achieved without third harmonic distortion.

The resonant network includes a capacitor shunted by an inductor in series with the lamp load. Component values are selected so that these circuit elements together exhibit capacitive reactance under all lamp impedance conditions. Another inductor is connected in series with these circuit elements to form a series resonant circuit across the inverter output. A phase detector or other circuit controls the inverter switching rate so that it equals the resonant frequency of the network. The circuit will work equally well with capacitors replacing the inductors and an inductor in place of the capacitor if high harmonics of the inverter frequence can be tolerated or desired in the load.

Dimming is accomplished either by varying the duty cycle of the inverter or by altering the dc voltage level provided to the inverter from the switching regulator.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is an electrical block diagram of the inventive power supply for a gas discharge lamp;

FIGS. 2A and 2B are electrical schematic diagrams of alternative switching regulator circuits that can be used in the power supply of FIG. 1;

DESCRIPTION OF THE PREFERRED EMBODIMENT

Figure 3A:
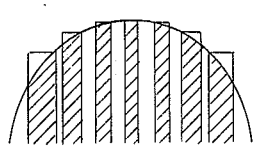
FIGS. 3A, 3B and 3C are graphs illustrating the effect on power factor of various types of switching regulator circuits.

The following detailed description is of the best presently contemplated modes of carrying out the invention. This description is not to be taken in a limiting sense, but is made merely for the purpose of illustrating the general principles of the invention since the scope of the invention best is defined by the appended claims.

Operation characteristics attributed to forms of the invention first described also shall be attributed to forms later described, unless such characteristics obviously are unapplicable or unless specific exception is made.

Referring to FIG. 1, the inventive power supply 10 is used to energize a gas discharge lamp 11 which may be of the mercury vapor, metal-halide, sodium or fluorescent type. To this end, ac power from a source such as the 60 Hz, 120 volt power lines, is connected via a pair of terminals 12a, 12b to a bridge rectifier 13.

The unfiltered output of the bridge rectifier 13 is supplied via the lines 14 and 15 to a switching regulator 16. No filtering is used at the output of the bridge rectifier 13 to eliminate both (a) the lagging power factor and distortion which would result if an inductor were used to filter the rectified ac, and (b) the third harmonic distortion which would result if a capacitor were used.

The switching regulator 13 provides a substantially constant dc voltage to a pair of output lines 17, 18. In accordance with the present invention, a filter capacitor 19 connected across the output lines 17, 18 has a value sufficiently large so as to filter at twice the ac line frequency (e.g., at 120 Hz). The duty cycle of the switching regulator 16 is controlled in response to the output voltage across the capacitor 19, and therefor will depend on the average voltage level over several cycles of the rectified ac supplied to the input of the regulator 16.

This is in contradistinction to the typical prior art arrangement in which the switching regulator duty cycle is responsive to changes in the input line voltage and in which a small output filter capacitor is used. Such a capacitor filters effectively at the regulator switching frequency (typically 20 kHz) but not at twice the line frequency (e.g., at 120 Hz). Therefor such a prior art regulator draws more current from the ac line during the low voltage portions of the ac cycle and less current during the high voltage portions. Such regulation produces a lagging power factor similar to that produced by inductive input filtering, and hence is undesirable. As noted above, this is eliminated by the inventive arrangement in which the output filter capacitor 19 is sufficiently large so as to filter over several cycles of the supplied rectified ac voltage.

The regulated dc voltage on the lines 17, 18 may be supplied to any load requiring direct current in FIG. 1 it is supplied to an inverter 20 which typically operates at a nominal frequency of 20 kHz. Thus the output of the inverter 20 is an ac voltage square wave having a nominal 20 kHz frequency. This ac voltage is fed to the lamp 11 via a resonant network 21 which includes the lamp 11 as an element of a resonant circuit. A feedback path 22 carries a control signal that adjusts the frequency of the inverter 20 to correspond to the resonant frequency of the network 21. In this manner, a resistive load is seen by the inverter 20 regardless of the operating condition of the lamp 11, and sinusoidal voltage is provided to the lamp, resulting in improved lamp efficiency. The inverter switches at the current null points of the network 21 output sinusoidal voltage, since the inverter 20 operates at the network 21 resonant frequency. Switching losses are reduced since the current through the inverter switching transistors is at or near zero when switching occurs. Therefor less expensive transistors of lower rating can be used.

Dimming of the lamp 11 can be accomplished by controlling the voltage supplied by the regulator 16 to the inverter 20. To this, an external adjustment 23 is provided to control the duty cycle and hence the voltage output of the switching regulator 16. Alternatively, the regulator 16 duty cycle may be controlled by a photocell 24 positioned to sense the light level at a location illuminated by the lamp 11. In this way, if sunlight produces a high ambient light level at the location, this will be sensed by the photocell 24, resulting in dimming of the lamp 11. Energy is conserved while the desired illumination level is maintained.

In some applications it may be desirable to control the output to the lamp 11 in response to the current flowing to the lamp. This can be accomplished by providing a current sensing resistor 25 in series with one of the lines 25, 26, to the lamp 11, as shown in FIG. 1. A feedback line 26 is connected between the resistor 25 and the switching regulator 16 so as to control the output voltage cycle in response to the sensed output current to the lamp 11.

FIG. 2A shows one type of switching regulator 16A that can be used as the regulator 16 in the power supply 10. A switching transistor 30 is turned on and off by an oscillator and drive circuit 31 at a rate (typically 30 kHz) that is above the audio range. When the transistor 30 is on, some energy is stored in an inductor 32 which maintains current during the off-time of the transistor 30 via a diode 33. A small RF filter capacitor 34 prevents RF signals, which may be generated by the switching transients of the transistor 30 from being conducted back to the ac line.

In such a regulator 16A, the output voltage is a direct function of the input supply voltage time the duty cycle or on-to-off time ratio of the transistor 30. Since the output of the bridge rectifier 13 is unfiltered, the supply voltage to the switching regulator 16 varies between zero and the peak ac line voltage, at twice the input ac frequency. In a conventional switching regulator, the on-to-off time ratio normally is varied in response to the input supply voltage so that the on-time is greatest when the input voltage is least. As illustrated in FIG. 3A, this results in maximum current flow when the input voltage is minimum. This corresponds to a negative or very lagging power factor, and is undesirable.

Figure 3B:
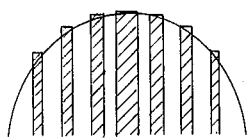

This effect can be overcome by reversing the conventional approach and (a) making the on-time of the switching transistor 30 a maximum when the input voltage is greatest, and (b) using an inductor 32 that is sufficiently large so as to maintain substantially the same current through the switching transistor 30 regardless of the input voltage. With this arrangement, the current waveform can be matched to the voltage waveform, by controlling the on-time at each portion of the ac line half cycle as illustrated in FIG. 3B, thereby creating the effect of a resistive load or unity power factor.

Figure 3C:
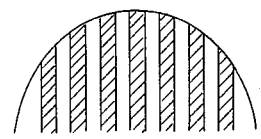

An alternative approach is (a) to make the inductor large with respect to the switching frequency (e.g., 30 kHz) but small with respect to the ac line frequency (e.g., 60 Hz), and (b) to hold the duty cycle (on-to-off time ratio) of the switching transistor 30 constant over a complete half-cycle of the input ac, but allowing it to vary only with gradual changes in the average input line voltage or required output voltage. In this case, the value of the output capacitor 19 must be sufficient to filter the strong, twice line frequency (e.g., 120 Hz) ripple that will be present at the regulator output. With this arrangement, the current waveform can be made very closely to correspond to the input voltage waveform, as illustrated in FIG. 3C. The result is a unity power factor devoid of harmonic distortion.

A different form of switching regulator 16B, also usable as the regulator 16 in the power supply 10, is shown in FIG. 2B. Here the inductor 35a is the primary winding of a ferrite core transformer 35, and is connected in series with the switching transistor 36 across the input lines 14, 15 from the bridge rectifier 13. With this arrangement, the inductor 35a is loaded and unloaded each time the transistor 36 is turned on and off at the switching frequency. Output dc voltage is taken from the transformer secondary winding 35b via a diode 37. This circuit offers the advantage that should the switching transistor 36 become shorted for any reason, input current will not flow to the load.

In the circuit 16B, the output voltage may be regulated either by varying the switching frequency or the duty cycle. With variable frequency control the oscillator and drive circuit 38 advantageously includes a voltage controlled or like oscillator, the nominal frequency of which is controlled by the external adjustment 23, the photocell 24 or the feedback signal on the line 26. Here again, the capacitor 19 should be sufficiently large so as to filter effectively at twice the ac line frequency. Changes in the filtered output voltage are used to vary the frequency of the oscillator and drive circuit 38 thereby to connect the switching frequency so as to achieve substantially constant output voltage.

Figure 4A:
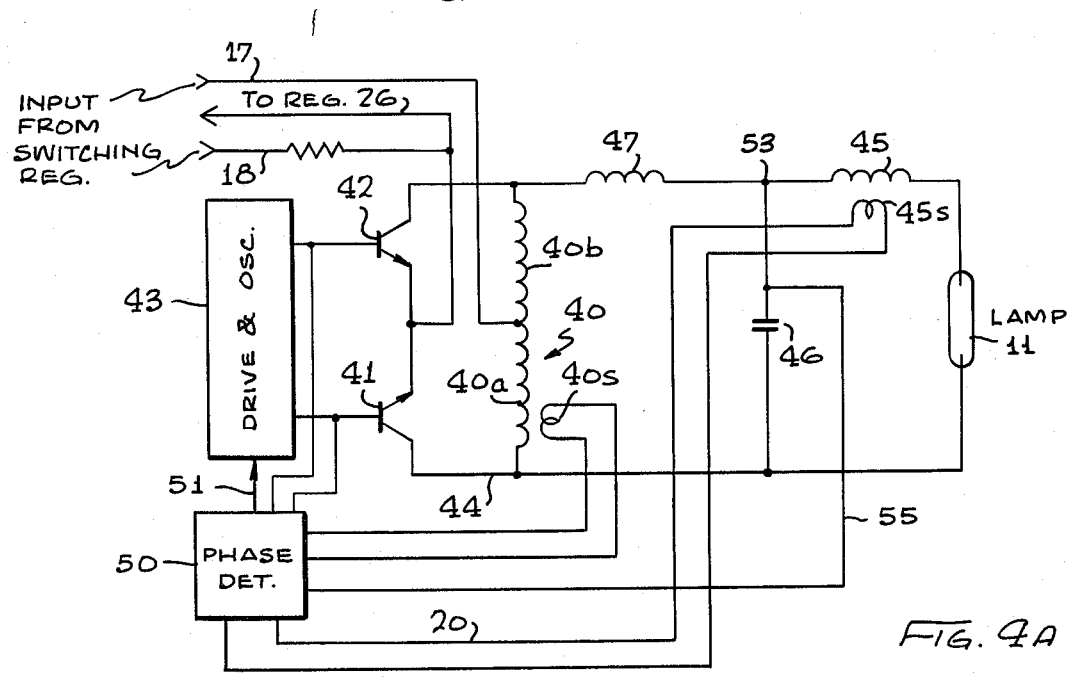
FIG. 4A is an electrical schematic diagram of the inverter and resonant network components of the power supply of FIG. 1.

Other forms of switching regulator circuits may also employ the novel concepts claimed herein of tayloring the duty cycle to provide unity power factor without line distortion. Details of one format of the inverter 20 and the resonant network 21 are shown in FIG. 4A. The regulated dc voltage from the switching regulator 16 is supplied alternately to one or the other half windings 40a, 40b of an auto transformer 40 via a respective transistor 41 or 42. These two transistors 41, 42 are alternately driven into conduction by an oscillator and drive circuit 43, one embodiment of which is shown in FIG. 5. Advantageously, the drive circuit 43 switches one of the transistors 41, 42 completely off before turning the other one on. This insures that both transistors 41, 42 are never on at the same time. If both transistors were to be on together, very high current would be drawn, greatly reducing circuit efficiency and subjecting the transistors 41, 42 to damage. With the circuit shown in FIG. 4, the ac voltage developed across the autotransformer 40 on the lines 44, 45 is twice the dc input voltage. If the output of the regulator 16 is selected to be in the range of about 35 v dc to 50 v dc, the ac voltage developed across the lines 44, 45 will be on the order to 70 v to 100 v; thus, the use of the regulator suffering a lower voltage than line to the inverter allows the additional advantage of the use of inexpensive low voltage components.

The resonant network 21 includes the lamp 11 in series with an inductor 45 across a capacitor 46. Since the gas discharge lamp 11 is a negative impedance, which operates at relatively constant voltage, the inductor 45 serves in part to limit current flow through the lamp 11. Further, the inductor 45 and the lamp 11 together represent an inductive reactance in parallel with the capacitor 46. The value of the capacitor 46 is selected so that even when the lamp 11 appears as a short circuit (e.g., during the warm-up of a high intensity discharge lamp) an inductive reactance is present, the combined reactance of the parallel circuit including the lamp 11, the inductor 45 and the capacitor 46 will be capacitive. This capacitive reactance resonates with a series inductor 47.

The frequency of the inverter 20 is controlled such that the reactance of the inductor 47 equals the capacitive reactance of the series-parallel combination of the capacitor 46, the inductor 45 and the lamp 11. Under such resonant condition, the network 21 presents a resistive load to the inverter 20. A unity power factor is achieved. Moreover, under such resonant condition, a sinusoidal voltage is presented to the lamp 11 and a sinusoidal current load is seen by the inverter 20. Thus, even though the transistors 41, 42 are switched full on and full of in "square-wave" fashion by the drive circuit 43, the current through the transistors 41, 42 is at a minimum when the switching occurs, as the sinusoidal signal across the resonant network 21 is going through null at this time.

Under various operating conditions of the lamp 11, the effective impedance of the lamp 11, and hence the resonant frequency of the network 21 will change. A feedback circuit is used to correct the frequency of the invertor 20 so as to maintain the inverter frequency in resonance with the network 21 when such lamp impedance changes occur. To this end, a phase detector 50 (FIG. 4) compares the phase of the signal across the inductor 47, as sensed by a sense winding 47, with the phase of the signal across the transformer 40 as detected by a sense winding 40s. The phase of signal from winding 47s may also be compared with the phase of the drive signal to transistors 41 and 42 with the same result.

Since in an inductor the current through it is 90 degress out of phase with the voltage across it and since the current in inductor 45 is equal to that flowing in the load the voltage on the sense winding 45s on inductor 45 will be 90 degrees out of phase with the current in the load therefore with the voltage across the load since the load is not reactive. At the proper frequency for resonance of the network the voltage input to the network must be in phase with the voltage across the load for the network to appear resistive to the inverter. The phase detector 50 senses whether the actual phase difference is indeed 90 degrees, indicating that the inverter 20 is operating at the resonant frequency of the network 21. If not, an error signal is produced on a line 51 that causes the oscillator and drive circuit 43 to alter frequency until the resonant condition against is achieved.

At resonance, a voltage gain is achieved by the resonant network 21. The voltage developed across the capacitor 46, between the point 53 and the line 44, is related to the Q of the network 21 times the input voltage from the inverter 20. This developed voltage is normally selected to be on the order of 700 v to 800 v ac, which is some three to four times greater than that required to sustain normal operation of a typical gas discharge lamp. Since the lamp and network 21 at resonance appear as a resistive load, and since the effective reactance of the network 21 components is high with respect to the lamp 11, substantially constant current will flow through the lamp 11, even though the voltage across the lamp will change under different operating conditions.

These operating characteristics make the inventive power supply 10 ideal for driving both high intensity discharge (HID) and fluorescent lamps. For metal halide, sodium and other HID lamps, the supply will provide proper drive for starting, during the warm-up period and for normal operation. For fluorescent lamps, proper drive and flickerless dimming is possible.

Typical HID lamps require a starting voltage that is substantially higher than the operating voltage for the same lamp after it has heated up. Until actually started, the impedance of an HID lamp is infinite, that is, it appears as an open circuit. In this start-up mode, the inductor 45 (FIG. 4) is effectively out of the circuit, and the resonant network 21 consists effectively of the capacitor 46 in series with the inductor 47. Since these are relatively lossless elements, the network 21 will exhibit a very high Q. The voltage developed across the capacitor 46, and hence across the capacitor 46, and hence across the lamp 11, will become very high, potentially reaching over a thousand volts. This high voltage will insure initiation of conduction of the lamp, regardless of the lamp's condition or age. In many cases, the supply 10 will start a lamp 11 that has deteriorated to a point where it cannot be started with a conventional ballast, the result is improved useful lifetime for the lamp.

With no load current flowing there is no voltage drop across inductor 45 thus no feedback on sense winding 45s therefore for open load conditions voltage is sensed at the junction 53 of capacitor 46 and inductor 47 and supplied to phase detector 50 by line 55. Under such open load conditions the voltage will continue to rise at point 50 as long as the regulator will supply the necessary current to the inverter. Therefore, current to the inverter is sensed by the voltage across resistor 56 and fed back to the regulator 16 on line 26 to control the input to the inverter and therefore the maximum voltage permissable at point 53.

During warm-up, an HID lamp typically exhibits a very low impedance and thus presents virtually a short circuit load. In a conventional system this would place a very high current demand on the power supply. In the inventive power supply 10 however, the actual short circuit of the lamp 11 is not seen as a shortened load. Rather, the "short circuit" effectively inserts the inductor 45 across the capacitor 46, thereby changing the resonant frequency of the network 21 but not shorting the supply. The feedback circuit will shift the frequency of the inverter 20 to the new resonant frequency of the network 21, and the current limiting characteristic of this network will limit the current flow through the lamp 11 as it warms up. Subsequent to warm-up, when normal lamp operation is achieved and the lamp impedance is finite but not short-circuited, proper voltage with substantially constant current will continue to be provided by the supply 11. The inverter 20 frequency will automatically be set somewhere between the extremes corresponding to the lamp start and lamp warm-up conditions at the new resonant frequency of the network 21. Diming to the HID lamp can be achieved either by changing the dc voltage supplied to the inverter 20 by the switching regulator 16 or by altering the duty cycle of the inverter 20.

Among the benefits provided by the inventive power supply 10 are improved efficiency and the elimination of flicker in a metal arc lamp. The high frequency (typically 20 kHz) drive provided by the inverter 20 tends to create a smaller diameter ion stream in a HID lamp then if the same lamp were driven at the ac line frequency. Increased efficiency results since concentration of the current into a smaller area creates a higher energy level in the gas molecules, thereby inducing more light output.

In prior art high frequency drive sources, flicker was produced in the metal arc lamp. Since the lamp tube diameter provided for a larger ion stream than that which is present with high frequency drive, the smaller diameter ion stream is free to wander or move about in the unconfined area within the tube. This moving is referred to as "flicker". It sometimes appears as slowly moving or rotating standing waves in the ion stream.

It has been found that flicker is eliminated by the frequency control employed in the inventive power supply 10. The movement of the ion stream is accompanied by a slight change in lamp impedance. As discussed above, this results in a concomitant change in the resonant frequency of the network 21 and hence in a corrective change in the frequency of the inverter 20. This change in drive frequency has been found to eliminate flicker.

A benefit of the inventive system is that conventional, inexpensive components can be used. In the inverter 20, the transistors 41, 42 need exhibit only a reasonable switching time, because of the modest switching frequency of about 20 kHz, and since the drive circuitry 43 provides for a quiescent time between turn-off of one transistor 41 or 42 and turn-on of the other. Use of a dc supply voltage from the regulator 16 of between 35 v dc and 50 v dc permits use of transistors 41, 42 rated at about 100 volts. The use of a sinusoidal output signal also reduces the performance requirements and hence the cost of the switching transistors 41 and 42.

Figure 4B:
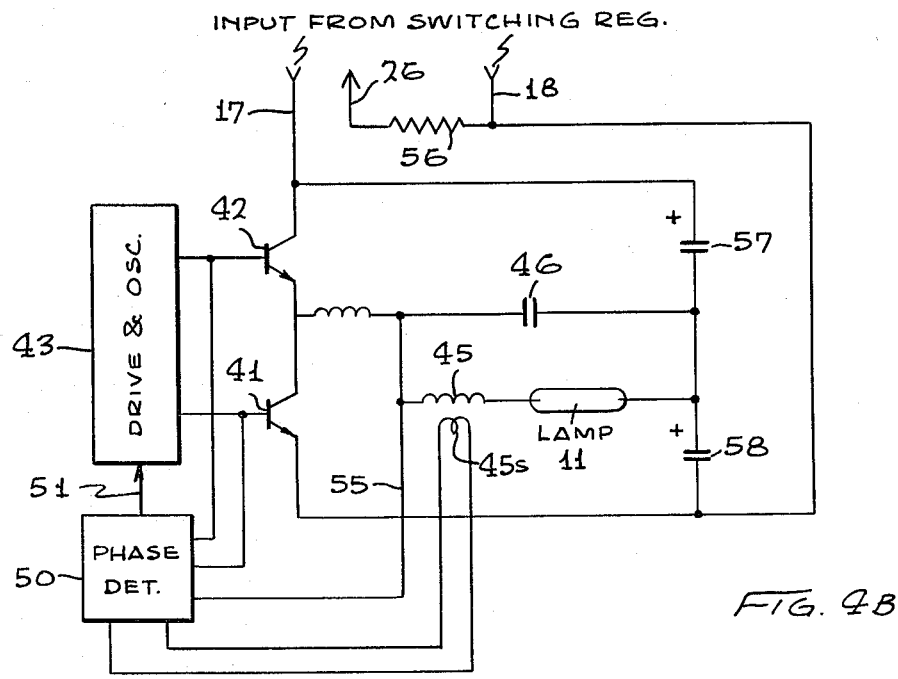
FIG. 4B is the same as 4A with a different inverter configuration.

FIG. 4B shows another inverter configuration that eliminates transformer 40 and adds capacitors 57 and 58. Besides the advantages of simplicity and size this circuit puts even less voltage strain on transistors 41 and 42. Higher voltage from the regulator may be used when desired with transistors having the same voltage rating as shown in FIG. 4A. Also, voltage spikes associated with transformer drive are eliminated. Inductor 47 will increase in size somewhat however.

An optional feature of the present invention is that it facilitates battery operation of a gas discharge lamp, particularly during periods of power failure of the ac line source. To this end, a battery 70 may be connected in series with a diode 71 across the output lines 17, 18 from the regulator 16, as shown in FIG. 1. During normal operation, the diode 71 effectively disconnects the battery 70 from the circuit. However, in the event of an ac power failure, the battery 70 will provide input voltage to the inverter 20, maintaining the lamp 11 lit. If dimming is required, the voltage of the battery 70 must be equal to the lowest desired output of the regulator 16. In such instance, the lamp light output will be dimmed under battery operation, but will be remain illuminated, e.g., for emergency evacuation purposes. The lower battery voltage will result in longer operation. A charging circuit 72 may be provided to charge the battery 72 from the dc voltage present at the regulator 16 output during periods of normal operation.

Use of the standby battery 70 is particularly valuable with the HID lamps. If an HID lamp is extinguished, it must first be cooled before it can be relit. With standby battery operation, the HID lamp will not be extinguished during short power outages, and therefore will come back on immediately to the set intensity when the power is restored.

As noted, the inventive circuit provides for dimming the lamps. To accomplish this, the input dc voltage from the switching regulator can be varied. This dc voltage level can be adjusted manually using the external adjustment 23 or in response to some other condition, as for example the ambient light level sensed by the photocell 24. Dimming is effectuated since the voltage developed across the capacitor 46 (FIG. 4) is a direct multiple of the voltage supplied to the network 21 which itself is twice the dc input voltage from the regulator 16.

By altering the regulator 16 output, the voltage across the capacitor 46 will be altered accordingly. Since the inductor 45 is the principal source of impedance in the series connection of the inductor 45 and the lamp 11, the current through the lamp will be related almost directly to the voltage across the capacitor 46. Thus a change in input voltage will cause the lamp 11 current to drop proportionately. The lamp will remain lit at a changed intensity. The high voltage available across the capacitor 46 will keep the lamp 11 lit even at lower intensity levels, despite the negative resistance characteristics of the lamp, thereby insuring flickerless dimming performance.

Intending to claim all novel features shown and described, the inventor:

I claim:

1. A power supply for a gas discharge lamp comprising:
    a source of DC voltage;
    an inverter connected to receive DC voltage from said source comprising a pair of switching transistors for alternately switching DC voltage from said source;
    a resonant network whereby the output of the inverter as presented to the lamp will be sinusoidal in wave shape;
    said inverter includes a transformer, the output of said transformer being connected to said resonant network which is in turn connected to the lamp;
    an oscillator connected to control the switching rate of said pair of switching transitors to switch said transistors at such time as the current flowing in or out of said resonant circuit shall be at or near zero;
    a feed-back means which determines that said resonant network is at resonance and that it presents a resistive load to said inverter;
    a frequency control means for said oscillator connected to the feedback means in such a manner as to control the frequency to maintain resonance in said resonant network.

2. A power supply according to claim 1 wherein said feedback means comprises;
    a first sense winding on said transformer of said inverter;
    a second sense winding on a reactor of said network;
    a phase detector connected to receive the said signals from said first and second sense windings and to provide an output indicative of the phase relationship there between; and
    means for controlling the frequency of said oscillator and, hence, the switching rate of said inverter in response to the phase indicative output signal from said phase detector.

3. A power supply according to claim 1 wherein said feedback means comprises;
    a phase detector connected to receive signals from first, the output of said oscillator driving the switching transistors, and, second, the voltage present within the network; and
    means for controlling the frequency of said oscillator and, hence, the switching rate of said inverter in response to the appropriate phase relationship required to maintain a purely resistive load on said inverter output.

4. A power supply for a gas discharge lamp comprising:
    a source of DC voltage;
    an inverter connected to receive DC from said source comprising a pair of switching transistors;
    a resonant network including said lamp wherein said network is connected to the output of said inverter;
    feedback means operably connected to said resonant network and to said inverter for controlling the switching rate of said inverter so that it is maintained at the resonant frequency of said resonant network by commutating the voltage applied to said resonant network at such times as the current flowing in or out of said resonant circuit shall be at or near zero;
    said inverter comprises;
    an autotransformer, having an output connected to said resonant network;
    first and second switching transistors connected to supply DC voltage from said source to said autotransformer in respective first and opposite polarity; and
    oscillator and drive circuitry connected to said switching transistors for alternately turning one transistor on and the other transistor off, said circuitry providing a delay after each transistor is turned off before the other is turned on; and
    said feedback means controls the frequency of said oscillator and drive circuitry via phase detection.

5. A power supply according to claim 4 wherein it further consists:
    duty cycle control means cooperating with said oscillator and drive circuiting, for symmetrically adjusting the relative on and off times of said first and second switching transistors.

6. A power supply for a gas discharge lamp comprising:
    a source of DC voltage;
    an inverter connected to receive DC voltage from said source;
    a resonant network including said lamp wherein said network is connected to the output of said inverter;
    feedback means operably connected to said resonant network and to said inverter for controlling the switching rate of said inverter so that it is maintained at the resonant frequency of said resonant network by commutating the voltage applied to said inverter at such times as the current to and from said resonant network is at or near zero;
    said resonant network comprising:
    a reactor;
    a second reactor of opposite polarity of said first reactor connected in series with said lamp across said first reactor, the values of said first and second reactors being selected so that said lamp, said second reactor and said first reactor together exhibit a reactance of the sign of said first reactor, and a third reactor of opposite reactance sign connected in series with said previously described first reactor, second reactor and lamp combination so as to form a series resonant circuit.

7. A direct current power supply, comprising:
a source of DC voltage which includes rectification means for converting AC line power to pulsating DC;
a switching regulator;
connection means allowing the essentially unfiltered pulsating DC to be the source for said switching regulator;
said switching regulator made deliberately nonresponsive to the frequency of the pulsating DC supplied by said rectification means so as not to compensate for the variation of input voltage at the pulsating frequency;
said switching regulator output is filtered by a large capacitor to make up for the regulator's nonresponsiveness to the variation in input voltage to said switching regulator caused by said pulsating DC;
wherein said nonresponsiveness is accomplished by maintaining the on to off time ratio of the said switching regulator essentially constant over the full AC half cycle with any such ratio changes occurring over the average input voltage such that changes will not appreciably affect said ratio during any one half cycle of AC line power.

8. A power supply according to claim 7 wherein said switching regulator comprises;
a switching transistor connected in series with a storage inductor in series with a still further output filter capacitor, the output being taken from across said capacitor;
a diode connected across the series combination of said storage inductor and said output capacitor; and,
drive circuitry for said switching transistor deliberately made nonresponsive to changes in the input voltage at the pulsating DC frequency that are reflected at the output.

9. A power supply according to claim 7 wherein a small capacitor is inserted across the output of the rectifier means and thus the input of said switching regulator, said capacitor having an impedance high enough not to cause any filtering affects at the low line frequency but low enough to adequately filter the high frequency of the inverter;
said capacitor averaging the high frequency switching pulses and thus producing in conjunction with the constant on to off ratio of the switching transistor a current wave form essentially in phase with the line voltage input.

10. A power supply according to claim 7 wherein said switching regulator comprises;
a storage inductor type transformer;
a primary winding of said transformer connected in series with a switching transistor;
a secondary winding of said transformer polarized to discharge when said switching transistor is in the nonconductive mode by means of a diode connecting in series with said secondary winding;
a drive for said switching transistor made deliberately nonresponsive to the pulsating DC supplied by said rectification means; and
an output filter capacitor made large to make up for the regulators nonresponsiveness to the pulsating DC supply.

11. A power supply according to claim 10 wherein a small filter capacitor is connected across the input of said switching regulator to filter the high frequency only.

12. A power supply according to claim 7 wherein said switching regulator comprises;
a switching transistor connected in series with a storage inductor large enough to maintain near constant current during the line frequency time of one half cycle in series with an output filter capacitor, the output being taken from across said capacitor;
a diode connected across said storage inductor and output capacitor series combination; drive circuitry for said switching transistor deliberately made inversely responsive to the line frequency voltage changes to produce an average current equal in wave form to that of the line input voltage; and,
a small filter capacitor connected across the input to said switching regulator to filter the high frequency only.

13. A gas discharge lamp ballast comprising:
a source of direct current and voltage;
an inverter which generates a square wave output;
a resonant network placed between the inverter and the gas discharge lamp, said resonant network constructed to draw current in a sinusoidal manner from said inverter; and
a feedback means to control the frequency of said inverter such that the lamp will always effectively appear as a resistive load to said inverter in that the sinusoidal current drawn from said resonant network and lamp combination will be in phase with the square wave output of said inverter such that the said voltage and said current will pass through zero at or near the same time regardless of wide variations in lamp impedance.

14. A gas discharge lamp ballast according to claim 13 wherein said inverter comprises switching elements and wherein said resonant network is constructed such as to demand current from the inverter in a sinusoidal manner in order that when said inverter is operating at the resonant frequency of said resonant network the switching elements of said inverter are switched only at that time that the time derivative of current flowing through them is at or near maximum.

15. A gas discharge lamp ballast according to claim 13 wherein said feedback comprises;
a phase detector connected to receive signals from first, the output of said oscillator driving the switching transistor, and, second, the voltage present within said resonant network; and,
means for controlling the frequency of said oscillator and, hence, the switching rate of said inverter in response to the appropriate phase relationship required to maintain a purely resistive load on said inverter output.

16. A gas discharge lamp ballast according to claim 13 wherein said resonant network comprises;
a first reactor;
a second reactor of opposite polarity of said first reactor connected in series with said lamp across said first reactor, the values of said first and second reactors being selected so that said lamp and said second reactor and said first reactor in the described configuration exhibit a reactance of the sign of said first reactor; and, a third reactor connected in series with said previously described combination of said first reactor, second reactor, and lamp, so as to form a series resonant circuit.

17. A gas discharge lamp ballast according to claim 16 wherein the performance of said lamp and said first, second and third reactor combination is fed back to the inverter driver such that said inverter operates always at the resonant frequency of said reactor combination regardless of changes caused by variation in said lamp characteristics.

18. A gas discharge lamp ballast according to claim 13 wherein said inverter includes;
   a transformer, the output of said transformer being connected to a resonant network which is in turn connected to said gas discharge lamp;
   a pair of switching transistors for alternately switching DC voltage from said source of the input of said transformer;
   an oscillator connected to control the switching rate of said pair of switching transistors;
   a feedback means which determines that the resonant network is at resonance and that it presents a resistive load to said inverter transformer output; and,
   a frequency control means for said oscillator connected to said feedback means in such a manner as to control the frequency to maintain the network at resonance.

19. A gas discharge lamp ballast according to claim 18 wherein said feedback means comprises;
   a first sense winding of said transformer of said inverter;
   a second sense winding on a reactor of said network;
   a phase detector connected to receive the said signals from said first and second sense windings and to provide an output indicative of the phase relationship therebetween; and,
   means for controlling the frequency of said oscillator and, hence, the switching rate of said inverter in response to the phase indicative output signal from said phase detector.

20. A gas discharge lamp ballast according to claim 18 wherein said feedback means comprises;
   a phase detector connected to receive signals from first, the output of said oscillator driving said switching transistors, and, second, the voltage present within said network; and,
   means for controlling the frequency of said oscillator and, hence, the switching rate of said inverter in response to the appropriate phase relationship between said first and second signals required to maintain a purely resistive load on said inverter output.

21. A gas discharge lamp ballast according to claim 13 wherein said inverter comprises;
   a first switching transistor connected between said direct current and voltage source and said resonant network;
   a second switching transistor connected between the input to said resonant network at the same point as said first switching transistor and the common of said direct current and voltage source;
   an oscillator and drive circuit to alternately switch said first and second switching transistor and to control the switching rate;
   a feedback means which determines that said resonant network is at resonance and that it presents a resistive load to the two switching transistors; and,
   a frequency control means for said oscillator connected to said feedback means in such a manner as to control the frequency to maintain said network at resonance.

22. A gas discharge lamp ballast according to claim 21 wherein the common side of said resonant network and lamp combination is the mid-point of two capacitors connected in series between said direct current and voltage source and the common of said source.

23. A gas discharge lamp ballast according to claim 21 wherein said feedback means comprises;
   a first sense means of the drive to said switching transistors;
   a second sense means consisting of a winding on a reactor of said network; and
   a phase detector means connected to receive the said feedback from said first and second sense means and to provide an output indicative of the phase relationship therebetween.

24. A gas discharge lamp ballast according to claim 23 wherein said second sense means consists of a voltage present within the resonant network.

25. A gas discharge lamp ballast according to claim 13 wherein said direct current and voltage source comprises;
   a source of DC voltage which includes rectification means for converting AC line power to pulsating DC;
   a switching regulator;
   connection means to allow the essentially unfiltered pulsating DC to become the source for said switching regulator, said switching regulator made deliberately nonresponsive to the frequency of said pulsating DC supplied by said rectification means so as not to compensate for the variation of input voltage at the pulsating DC frequency as reflected on the output of said switching regulator.

26. A gas discharge lamp ballast according to claim 25 wherein an external adjustment may be made in the on to off time ratio of the switching regulator in response to the illumination effect produced by said gas discharge lamp through the use of a photocell.

27. A gas discharge lamp ballast according to claim 25 whereby the said on to off time ratio of said switching regulator may be adjusted in response to a feedback means indicative of the current in said gas discharge lamp such that the voltage to said inverter will be that required to maintain a setable lamp current.

28. A gas discharge lamp ballast according to claim 13 wherein said source of direct current and voltage is comprised of a battery.

29. A gas discharge lamp ballast according to claim 28 wherein said source of direct current and voltage also comprises a switching regulator connected in such a manner as to supply power as long as line voltage is available, and allowing for said battery to commence supplying voltage to said inverter in the event of line power failure.

30. A gas discharge lamp ballast according to claim 29 wherein a charge means is provided from the said source of direct current and voltage to maintain the battery in a fully charged condition while the power line is supplying said source of direct current and voltage.

31. A power supply for a gas discharge lamp comprising;
   a source of DC voltage;
   a resonant network comprising: a reactor;

a second reactor of opposite polarity of said first reactor connected in series with said lamp across said first reactor, the values of said first and second reactors being selected so that said lamp, said second reactor and said first reactor together exhibit a reactance of the sign of said first reactor; and a third reactor connected in series with said first reactor so as to form a series resonant circuit with the reactance of said first reactor, said second reactor and said lamp;

an inverter connected to receive DC voltage from said source comprising:

a pair of switching transistors for alternately switching DC voltage from said source to the input of said resonant network; and an oscillator connected to control the switching rate of said pair of switching transistors;

feedback means comprising:

first sense means in said inverter;

second sense means in said network; and a phase detector connected to receive the signals from said first and second sense means and to provide an output signal indicator of the phase relationship therebetween; and means for controlling the frequency of said oscillator, and hence, the switching rate of said inverter, in response to the phase-indicative output signal from said phase detector such that the switching rate of said inverter is maintained at the frequency of said resonant network by commutating the voltage applied to said resonant network at such times as the rate-of-change of current flow in said resonant circuit is at or near maximum.

32. A power supply according to claim 31 wherein said inverter comprises;

an autotransformer, having an output connected to said resonant network;

first and second switching transistors connected to supply DC voltage from said source to said autotransformer in respective first and opposite polarity;

an oscillator and drive circuitry connected to said switching transistors for alternately turning one transistor on and the other transistor off, said circuitry providing a delay after each transistor is turned off before the other is turned on; and said feedback means controls the frequency of said oscillator and drive circuitry via phase detection.

33. A power supply according to claim 32 wherein it further comprises;

a duty cycle control means cooperating with said oscillator and drive circuiting, for symmetrically adjusting the relative on and off times of said first and second switching transistors.

* * * * *